April 21, 1964     C. E. HOFBAUER ETAL     3,129,769
FAIL SAFE DEVICE FOR SERVO FLAP CONTROLLED ROTOR BLADES
Filed Sept. 21, 1962     2 Sheets-Sheet 1

INVENTORS
CASPER HOFBAUER
EDWARD E. SWANSON
BY
Teller, McCormick, Paulding & Huber
ATTORNEYS

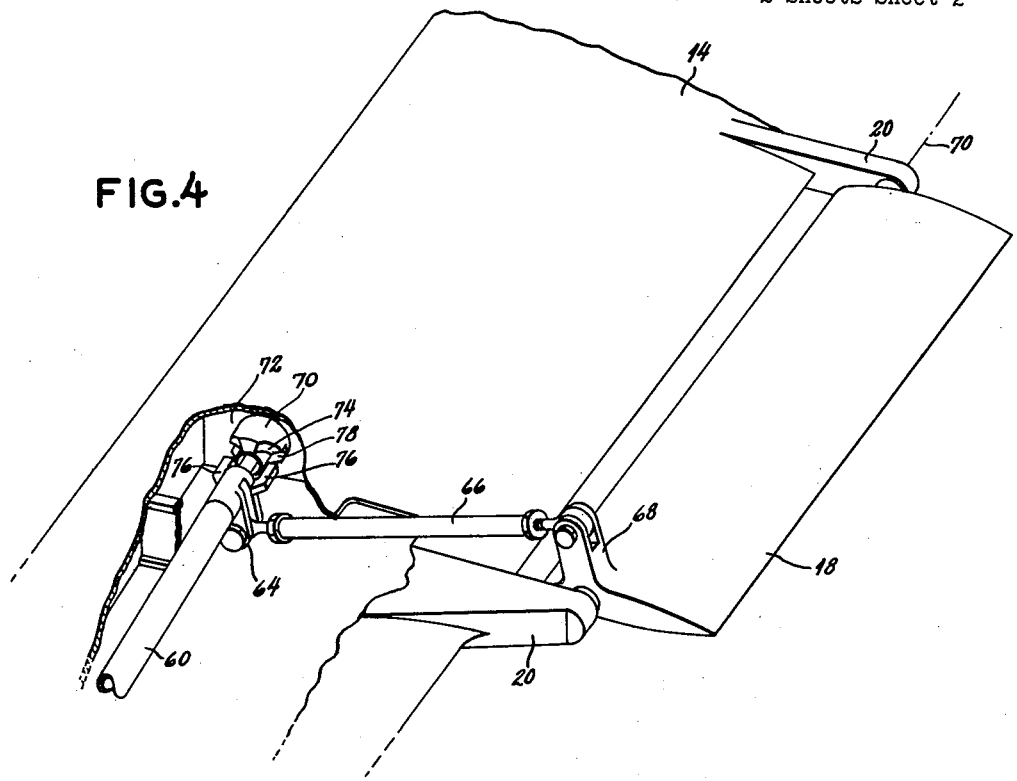
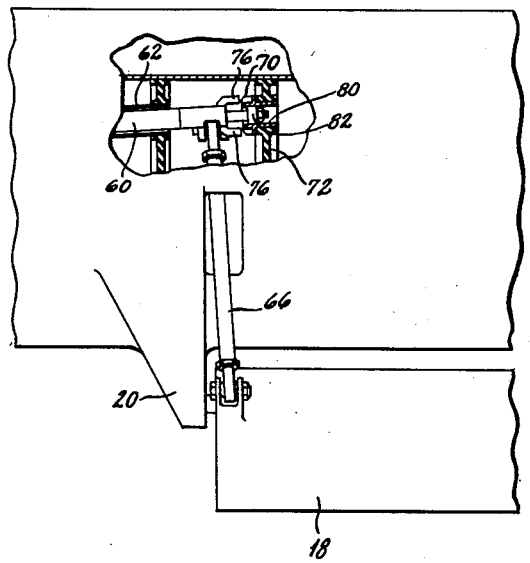
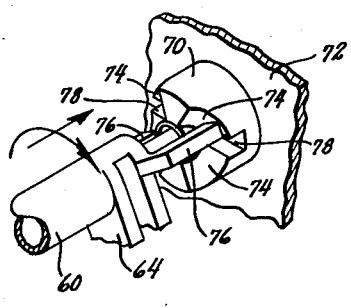

United States Patent Office 3,129,769
Patented Apr. 21, 1964

3,129,769
FAIL SAFE DEVICE FOR SERVO FLAP
CONTROLLED ROTOR BLADES
Casper E. Hofbauer, Winter Park, Fla., and Edward E.
Swanson, Windsor, Conn., assignors to Kaman Aircraft
Corporation, a corporation of Connecticut
Filed Sept. 21, 1962, Ser. No. 225,205
10 Claims. (Cl. 170—160.1)

This invention relates to helicopters, and deals more particularly with helicopters having main lifting rotors controlled in pitch by means of servo flaps attached to the blades of the rotors and movable relative thereto by means of pilot operable mechanisms or the like within the bodies of the helicopters.

The use of servo flaps, which react aerodynamically with the air, to move the blades of a helicopter about their pitch changing axes is well known in the helicopter art. Such flaps are conventionally attached to the rotor blades so as to be located in front of the leading edges thereof or behind the trailing edges thereof for movement relative to the blades about pivot axes extending generally parallel to the spanwise pitch changing axes of the blades. Movement of each flap in one direction or another about its pivot axis produces an aerodynamics force on the flap which tends to rotate the blade in one direction or the other about its pitch changing axis, the force exerted on the blade being resiliently resisted by the twisting of the blade itself or by the yielding of a spring or other special resilient mounting means for the blade. In all known servo flap systems the flaps are moved about their pivot axes by linkage including a pilot operable stick or the like in the pilot's compartment of the fuselage and rods extending spanwise through the rotor blades for transmitting control movements of the stick to the flaps. The latter rods may be either push-pull members, wherein the control movements consist of spanwise reciprocating movements of the rods, or torque members wherein the control movements consist of angular movement of the rods about their longitudinal axes. In any event the control rods do extend lengthwise of the blades and are therefore subject to centrifugal forces as the rotor rotates. These forces may and do become quite large at normal speeds of rotation and therefore present the possibility of failure of the rods or of other parts of the control system subject to the centrifugal loading. In the event of such a failure, control of the associated blade is lost with the result that the blade may take on erratic pitch changes leading to destruction of the blade or loss of control of the entire rotor.

The general object of this invention is therefore to provide a servo flap controlled helicopter rotor blade including a fail safe device for preventing the entire loss of control of the helicopter or other catastrophic effects in the failure of one of the spanwise control rods or other parts associated therewith.

A more particular object of this invention is to provide a fail safe device for a servo flap controlled rotor blade whereby the associated servo flap is moved to and held in a neutral position, resulting in a generally zero pitch angle for the blade, in the event of failure of the spanwise control rod or other parts associated therewith.

A further object of the invention is to provide a fail safe device of the above character particularly adapted for use in association with a spanwise control rod of the push-pull type.

A still further object of the invention is to provide a fail safe device of the above character particularly adapted for use in association with a spanwise control rod of the torque type.

Other objects and advantages of the invention will be apparent from the following description and from the drawings forming a part hereof.

The drawings show preferred embodiments of the invention and such embodiments will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 4 is a fragmentary perspective view of a rotor blade including a torque type spanwise control rod and a fail safe device in accordance with the present invention, the skin and other parts of the blades being broken away to show more clearly the structure of the fail safe device.

FIG. 5 is a fragmentary plan view of the blade shown in FIG. 4 with the skin and other parts of the blade being broken away to show more clearly the structure of the fail safe device.

FIG. 6 is an enlarged fragmentary perspective view of the fail safe device of FIG. 5.

Figure 1:
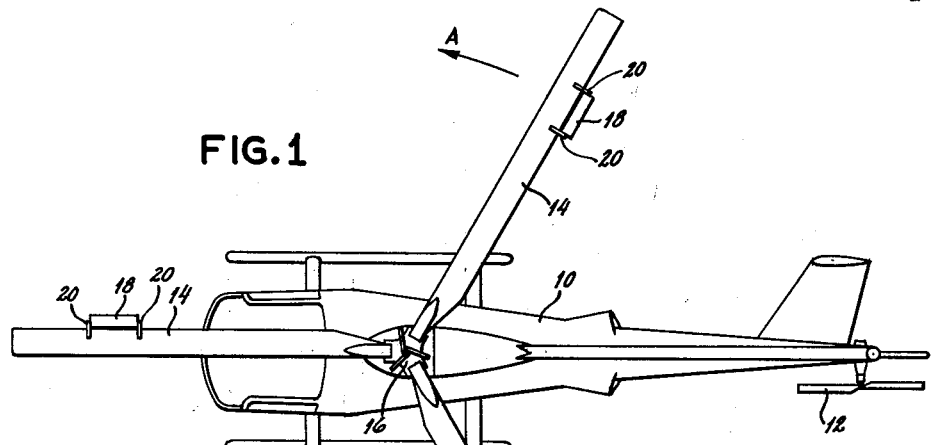
FIG. 1 is a plan view of a helicopter including servo flap controlled rotor blades.

Referring now to the drawings, FIG. 1 shows a helicopter having servo flap controlled blades which may include the fail safe device of the present invention. In this figure the fuselage of the helicopter is indicated generally at 10 and the tail rotor is indicated at 12. The helicopter is of the single lifting rotor type and this single rotor includes three blades 14, 14 attached to a hub 16 for movement relative to the fuselage 10 about a generally vertical rotor axis. Attached to each blade 14 is a servo flap 18 which in the present case is shown to be located in trailing position with respect to the main body of the blade, the direction of the rotor rotation being indicated by the arrow A. Each flap 18 is supported by two brackets 20, 20 for movement relative to the associated blade about an axis extending generally parallel to the spanwise pitch changing axis of the blade for the purpose of producing aerodynamic forces on the blade for moving the latter about said spanwise pitch changing axis.

Figure 2:
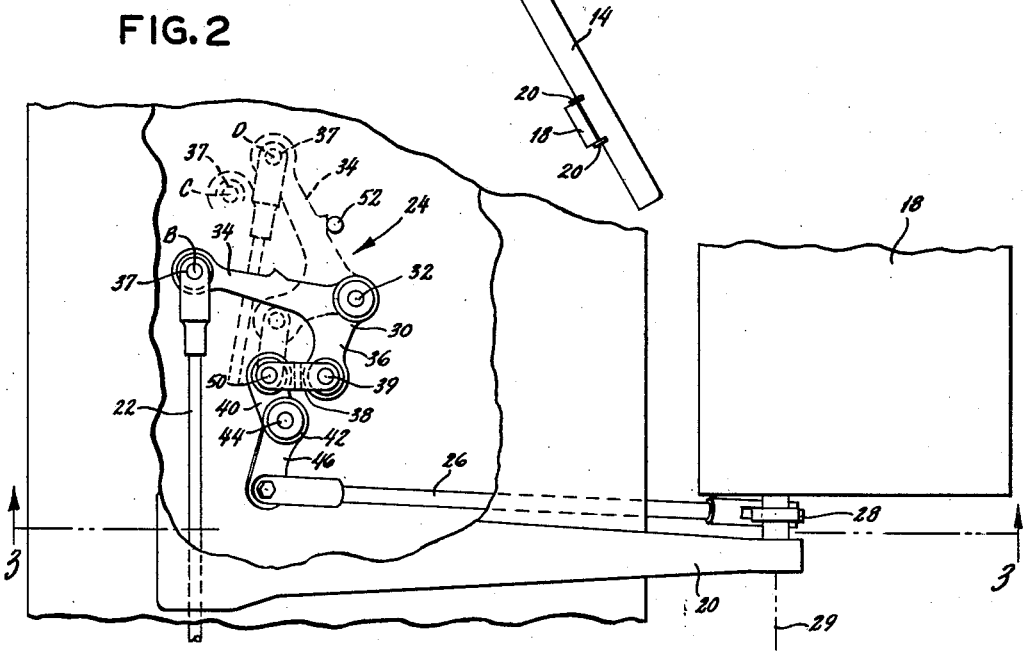
FIG. 2 is a fragmentary plan view of a rotor blade including a push-pull spanwise control rod and a fail safe device in accordance with the present invention, part of the skin of the blade being broken away to show more clearly the structure of the fail safe device.
Figure 3:
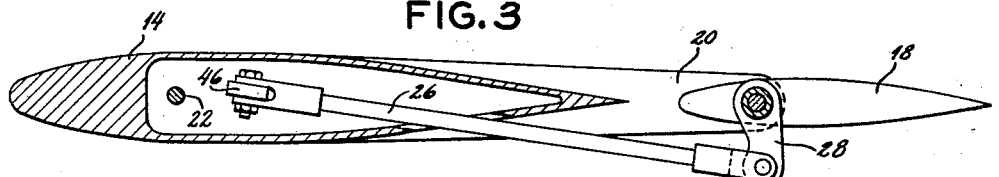
FIG. 3 is a transverse vertical sectional view taken on the line 3—3 of FIG. 2.

Referring now to FIGS. 2 and 3, these figures show a portion of a blade 14 similar to one of the blades of FIG. 1 and disclose the mechanism for moving the associated flap 18 relative to the blade body. In the mechanism illustrated by these two figures the flap 18 is controlled by a spanwise push-pull rod 22 which extends lengthwise through the associated blade 14 from the hub 16 to the location of the flap. At its inboard end the rod 22 is connected with an azimuth assembly and/or other linkage or conventional mechanisms (not shown) for moving the rod in response to movement of the pilot's collective and cyclic sticks and in response to the rotor rotation as determined by the cyclic stick setting. At its outer end the push-pull rod 22 is connected through a fail safe mechanism, indicated generally at 24 which normally functions to transform the longitudinal reciprocating movements of the rod 22 into reciprocating movements of a transverse link 26, the latter link being pivotally connected at its trailing end to a depending horn 28 fixed relative to the servo flap 18 so that the movement of link 26 results in pivoting movement of the servo flap 18 about its pivot axis indicated at 29 in FIG. 2. The fail safe device 24 also serves when the push-pull rod 22 moves outboard beyond its normal limit, as in the case of a failure of the rod or other retaining means associated therewith, to move the link 26 in such a manner as to move the associated servo flap 18 to its neutral position relative to the blade 14.

Referring to FIG. 2 the illustrated fail safe device 24 includes a first or input bell crank 30 supported for rotation relative to the blade about a generally vertical axis 32 and having a first arm 34 extending generally transverse of the blade and a second arm 36 extending generally longitudinally of the blade. The free end of the first arm 34 is pivotally connected to the outboard end of the pushpull rod 22 for relative movement about an axis 37, while the free end of the second arm 36 is pivotally connected to a short intermediate link 38 for relative movement about an axis 39. The other end of the latter link 38 is connected to one arm 40 of a second or output bell crank 42 pivotally supported for movement relative to the blade about a vertical axis 44. The latter bell crank also includes a second arm 46 which is pivotally connected to the leading end of the link 26, the latter arm 46 being inclined relative to the vertical axis 44 to accommodate the inclination of the link 26 as shown in FIG. 3. The intermediate link 38 is pivotally connected to the arm 40 of the second bell crank 42 for relative movement about an axis 50.

Referring more particularly to FIG. 2, the arrangement of the bell cranks 30 and 42 and of the intermediate link 38 is such that the resulting linkage serves to move the transverse link 26 in one direction or the other in response to movement of the spanwise control rod 22 in one direction or another along its longitudinal axis provided the rod 22 is operated within its normal range of movement and to move the transverse link 26 in the reverse fashion in response to movement of the rod 22 after the latter rod moves outwardly beyond an extreme position corresponding generally to the normal limit of its range of travel.

For example, in FIG. 2 the solid lines indicate the positions occupied by the parts when the rod 22 is positioned approximately at the mid point of its normal range of movement. With the rod 22 at this position the associated linkage provided by the bell cranks 30 and 46 and the intermediate link 38 serves to position the transverse link 26 in such a manner as to hold the flap 18 in a neutral position relative to the blade 14 at which neutral position the flap 18 has approximately a zero deflection angle and therefore serves to provide the blade itself with a substantially zero pitch angle. If the rod 22 is now moved inwardly toward the hub, or downwardly as viewed in FIG. 2, the bell crank 30 is pivoted about the axis 32 in the counterclockwise direction, and, due to the position of the link 38, the output bell crank 42 is rotated in the opposite or clockwise direction to move the transverse link 26 to the left, thereby pivoting the servo flap 18 about its longitudinal pivot axis 29 to move the trailing edge of the servo flap downwardly relative to the blade. If the control rod 22 is moved outwardly from the hub, or upwardly as viewed in FIG. 2, from the position shown by the solid lines in the latter figure, the bell crank 30 is moved in a clockwise direction and the bell crank 42 in the counterclockwise direction with the result that the transverse link 26 is moved to the right and the flap 18 pivoted to raise its trailing edge relative to the blade 14.

In FIG. 2 the letter B indicates the position of the pivot axis 37 when the servo flap is at its neutral or zero deflection position relative to the blade. The letter C represents the location of the same axis when the rod 22 is moved to the extreme outward limit of its normal range of travel. The letter D represents the position of this same axis when the rod 22 moves beyond its extreme normal position and to a positively limited position as defined by a stop means such as a pin 52 fixed relative to the blade 14 and engageable with the arm 34 of the bell crank 30 when the latter bell crank moves to such limited position.

Throughout the movement of the axis 37 between the points B and C the illustrated mechanism functions in the normal manner described above. That is, as the rod 22 moves outwardly toward the point C the servo flap 18 is moved to raise its trailing edge relative to the blade 14 with the deflection of the servo flap increasing as the axis nears point C. Movement of the rod 22 in the opposite direction to move the axis 37 away from the point C serves to move the servo flap in the opposite direction to decrease its deflection. When the axis 37 is at the point C the servo flap 18 has its maximum deflection and the axes 50, 39 and 32 are located on a common straight line. If the axis 37 is now moved beyond the extreme point C, as by continued outward movement of the rod 22, the axis 39 moves overcenter or beyond the line drawn between the axes 50 and 32 with the result that the bell crank 42 is now moved in the same angular direction about its axis 44 as the direction of movement of the bell crank 30 about its axis 32. That is, as the bell crank 30 now moves in the clockwise direction from the point C toward the point D the bell crank 42 is also moved in the clockwise direction with the result that the servo flap 18 is moved to lower its trailing edge relative to the blade 14 thereby decreasing its deflection. When the bell crank 30 reaches the position D as determined by the stop pin 52 the bell crank 42 is again positioned in the same attitude relative to the blade as when the axis 37 is in the neutral position B. That is, the position B of the axis 37 again corresponds to a neutral position of the flap 18. Accordingly, it is seen that in the event of failure of the rod 22 or any of the associated linkage normally retaining the rod within its normal range of movement, the bell crank 30, due to the centrifugal loads imposed on it and the outer end of the rod 22, will move to the broken line position of FIG. 2 at which position the servo flap 18 is moved to a safe neutral position to prevent any erratic pitch adjustments of the blade which might possibly result in destruction of the blade or entire loss of control of the aircraft.

Referring now to FIGS. 4, 5 and 6, these figures disclose an alternate embodiment of the present invention in which embodiment the servo flap 18 is controlled by a spanwise control rod 60 of the torque type. That is, the rod 60 is controlling the movement of the servo flap 18 is normally oscillated angularly about its longitudinal axis. As shown in FIG. 5 the rod 60 extends loosely through a tube 62 in the interior of the blade 14 and is supported for rotation about its longitudinal axis relative to the blade. At its outboard end the rod 60 has fixed thereto an arm 64 which extends perpendicular to the longitudinal axis of the rod and which moves about said latter axis in response to rotation of the rod. Pivotally connected to the outer or free end of the arm 64 is a generally transverse link 66 which is connected at its other end to a horn 68 on the servo flap 18 for moving the later flap about its longitudinal pivot axis, indicated at 70, provided by the brackets 20, 20. In FIGS. 4, 5 and 6 the control rod 60 is shown in its normal longitudinal position relative to the blade 14 and it will be understood that suitable retaining means are provided at the inboard end of the rod for preventing the same from moving outwardly under the action of centrifugal force from the normal position illustrated.

In accordance with the present invention, however, means are provided for moving the rod 60 to its neutral angular position, corresponding to a neutral or zero deflection position of the flap 18, in response to outward movement of the outboard end of the rod 60 as a result of a failure of the rod or of the means for retaining the rod in its normal longitudinal position. In the illustrated case this means comprises a cam block 70 fixed to a transverse rib or bulkhead 72 of the blade and located adjacent the outboard end of the rod 60. On the cam block 70 are two pairs of cam surfaces 74, 74 which face generally inwardly toward the rod 60. Cooperating with the cam block 70 are two fingers 76, 76 fixed to the rod 60 on diametrically opposite sides of the longitudinal axis thereof and extending radially outwardly toward the cam block. When the rod 60 is in its normal longitudinal position the fingers 76, 76 are longitudinally spaced from the cam block 70 so as to be out of engagement therewith. When the rod 60 moves outwardly, however, the fingers 76, 76 move against the cam faces 74, 74, and the latter faces are so curved and longitudinally inclined as to rotate the fingers 76, 76 about the longitudinal axis of the rod 60 to bring the latter rod to its neutral angular position corresponding to a zero deflection of the flap 18.

Referring to FIGS. 4 and 6 the cam block 70 is also preferably provided with two slots 78, 78 which extend some distance longitudinaly thereof and which serve to receive the fingers 76, 76 after the cam faces 74, 74 move the fingers to the neutral position. That is, the two cam faces 74, 74 of each pair are so curved as to guide the associated finger 76 into the associated slot 78 regardless of which of the two cam surfaces 74, 74 the finger engages when the rod 60 moves outwardly. After the fingers 76, 76 do move into the slots 78, 78 they are retained therein by the centrifugal force exerted on the rod and are prevented from moving angularly from the neutral position by the walls of the slot. It is therefore seen that failure of the rod 60, or of the associated retaining means, which causes the outboard end of the rod to move into engagement with the cam block will cause the servo flap to be moved to a safe neutral position.

Referring to FIG. 5, it should also be noted that the cam block 70 is provided with a longitudinal bore 80 coaxial with the longitudinal axis of the rod 60. Received within this bore is a bearing 82 which serves to support the outer end of the rod for normal angular movements and which is also slidably received in the bore 80 to permit longitudinal movement of the outboard rod end in the event of failure and also to guide the fingers 76, 76 into proper engagement with the cam surfaces 74, 74.

The invention claimed is:

1. In a helicopter rotor, the combination comprising a hub adapted for rotation about a central axis, a blade connected with said hub and extending generally radially outwardly therefrom, a servo flap connected with said blade and adjustable relative thereto about a generally radially extending pivot axis for aerodynamically positioning said blade about a spanwise blade pitch changing axis relative to said hub, a rod extending spanwise of said blade, said rod having a normal range of movement relative to said blade and having an outboard end which outboard end is located inboard of a given point on said blade throughout movement of said rod over said normal range of movement relative to said blade, and means for moving said servo flap between two extreme positions of adjustment relative to said blade as said rod is moved between the limits of said normal range of movement and for moving said servo flap to a neutral position between said extreme positions of adjustment in response to movement of said outer end of said rod radially outwardly beyond said given point.

2. In a helicopter rotor, the combination comprising a hub adapted for rotation about a central axis, a blade connected with said hub and extending generally radially outwardly therefrom, a servo flap connected with said blade and adjustable relative thereto about a generally radially extending pivot axis for aerodynamically positioning said blade about a spanwise blade pitch changing axis relative to said hub, a rod extending spanwise of said blade and reciprocable lengthwise relative to said blade throughout a normal range of such reciprocating movement, said rod having an outboard end which outboard end is located inboard of a given point on said blade throughout movement of said rod over said normal range of movement relative to said blade, and means for moving said servo flap between two extreme positions of adjustment relative to said blade as said rod is moved between the limits of said normal range of movement and for moving said servo flap to a neutral position between said extreme positions of adjustment in response to movement of said outer end of said rod radially outwardly beyond said given point.

3. In a helicopter rotor, the combination comprising a hub adapted for rotation about a central axis, a blade connected with said hub and extending generally radially outwardly therefrom, a servo flap connected with said blade and adjustable relative thereto about a generally radially extending pivot axis for aerodynamically positioning said blade about a spanwise blade pitch changing axis relative to said hub, a rod extending spanwise of said blade and oscillatable angularly about its longitudinal axis relative to said blade throughout a normal range of such angular movement, said rod having an outboard end which outboard end is located inboard of a given point on said blade throughout movement of said rod over said normal range of movement relative to said blade, and means connected with said rod and with said servo flap for moving said servo flap between two extreme positions of adjustment relative to said blade as said rod is moved between the limits of said normal range of movement and for moving said servo flap to a neutral position between said extreme positions of adjustment in response to movement of said outer end of said rod radially outwardly beyond said given point.

4. The combination defined in claim 2 further characterized by said means for moving said flap including an input crank connected with said outboard end of said rod and movable about a fixed axis relative to said blade in response to said longitudinal reciprocating movement of said rod, an output crank movable about a fixed axis relative to said blade and connected with said flap for moving the latter about its pivot axis in response to movement of said output crank about said latter fixed axis, and an intermediate link connected between said two cranks for moving said output crank in response to movement of said input crank.

5. The combination defined in claim 4 further characterized by said intermediate link being pivotally connected to said input crank for movement relative thereto about a first axis and pivotally connected to said output crank for movement relative thereto about a second axis, said cranks and said link being so constructed and arranged that said first axis of said link moves overcenter relative to the line drawn between said fixed axis of said input crank and said second axis of said link as said outboard end of said rod moves beyond said extreme position with the result that said flap is moved to a maximum deflected position relative to said blade as said outboard end of said rod is moved outwardly to said extreme position and is thereafter moved away from said maximum deflected position as said outboard end of said rod is moved outwardly beyond said extreme position.

6. The combination defined in claim 5 further characterized by stop means for limiting the movement of said input crank in the direction corresponding to movement of said rod in the outboard direction, said stop means being so arranged that the limited position of said input crank corresponds generally to said neutral position of said flap.

7. The combination defined in claim 3 further characterized by said means for moving said flap including an arm fixed to said rod for movement therewith about the longitudinal rod axis, linkage connected with said arm for moving said flap in response to movement of said arm, and means for moving said rod to a neutral angular position corresponding generally to said neutral position of said flap in response to longitudinal movement of said rod beyond said extreme position.

8. The combination defined in claim 7 further characterized by said means for moving said rod to a neutral angular position including a cam block fixed relative to said blade adjacent the outboard end of said rod and having cam surfaces facing generally toward said rod, and at least one finger on said rod normally positioned in spaced relationship to said cam surfaces and engageable with one of said cam surfaces when said outboard end of said rod moves beyond said extreme position, said cam surfaces being so shaped as to guide said finger to an angular position corresponding to said neutral position of said rod as a result of centrifugal force on said rod urging said finger against said cam surface.

9. The combination defined in claim 8 further characterized by said cam block having a longitudinally extending slot therein for receiving said finger and for holding the same in said angular position corresponding to said neutral position of said rod, said cam surfaces being arranged to guide said finger into said slot.

10. The combination defined in claim 8 further characterized by said cam block having a longitudinally extending bore coaxial with the longitudinal axis of said rod, and said rod having a portion of its outboard end extending into said bore and rotatably and slidably supported thereby.

References Cited in the file of this patent

UNITED STATES PATENTS

| 2,776,718 | Zuck | Jan. 8, 1957 |

FOREIGN PATENTS

| 800,890 | Great Britain | Sept. 3, 1958 |
| 1,213,762 | France | Nov. 2, 1959 |
| 1,213,809 | France | Nov. 2, 1959 |